United States Patent
Wu

(10) Patent No.: US 10,510,173 B2
(45) Date of Patent: Dec. 17, 2019

(54) IMAGE PROCESSING METHOD AND DEVICE

(71) Applicant: Tencent Technology (Shenzhen) Company Limited, Shenzhen (CN)

(72) Inventor: Lei Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 132 days.

(21) Appl. No.: 15/808,953

(22) Filed: Nov. 10, 2017

(65) Prior Publication Data

US 2018/0089874 A1    Mar. 29, 2018

Related U.S. Application Data

(63) Continuation of application No. PCT/CN2016/078940, filed on Apr. 11, 2016.

(30) Foreign Application Priority Data

May 22, 2015  (CN) .......................... 2015 1 0268553

(51) Int. Cl.
   *G06T 11/00* (2006.01)
   *G06T 15/50* (2011.01)
   *G06T 11/60* (2006.01)

(52) U.S. Cl.
   CPC ............ *G06T 11/60* (2013.01); *G06T 11/001* (2013.01); *G06T 15/503* (2013.01); *G06T 15/506* (2013.01)

(58) Field of Classification Search
   CPC ... G06T 11/001; G06T 15/506; G06T 15/503; G06T 11/60; G06T 15/50; G06T 5/005; G06T 5/50; G06T 2207/20216; G06T 2207/20212
   See application file for complete search history.

(56) References Cited

U.S. PATENT DOCUMENTS

| 6,767,286 B1 * | 7/2004 | Nagoshi | A63F 13/10 463/33 |
| 7,590,344 B2 | 9/2009 | Petschnigg | |

(Continued)

FOREIGN PATENT DOCUMENTS

| CN | 1818974 A | 8/2006 |
| CN | 1870055 A | 11/2006 |

(Continued)

OTHER PUBLICATIONS

Search Report in International Application No. PCT/CN2016/078940 dated Jun. 29, 2016, 4 pages.

(Continued)

*Primary Examiner* — Ke Xiao
*Assistant Examiner* — Andrew Shin
(74) *Attorney, Agent, or Firm* — Marshall, Gerstein & Borun LLP

(57) ABSTRACT

Various embodiments provide an image processing method. The method may include: acquiring an input image (310); extracting a light source parameter from the input image (330); adjusting color of a material image according to the light source parameter, obtaining an adapted material image matching the input image using a binarization processing according to the material image whose color has been adjusted (350); obtaining a flare effect image through calculation using the adapted material image according to the light source parameter (370); and blending the input image with the flare effect image (390). An image processing apparatus is also provided. The above method and image processing apparatus can adapt a simulated flare effect to a light source in an image, and can improve the sense of realism.

18 Claims, 8 Drawing Sheets

(56) References Cited

U.S. PATENT DOCUMENTS

| | | | |
|---|---|---|---|
| 2010/0110068 A1 | 5/2010 | Yamauchi et al. | |
| 2012/0320239 A1 | 12/2012 | Uehara | |
| 2013/0083971 A1* | 4/2013 | Du | G06K 9/00825 382/104 |
| 2015/0070375 A1* | 3/2015 | Lee | G06T 15/50 345/589 |
| 2016/0050364 A1* | 2/2016 | Lowell | H04N 5/23222 348/333.01 |
| 2016/0267710 A1 | 9/2016 | Huang et al. | |

FOREIGN PATENT DOCUMENTS

| | | |
|---|---|---|
| CN | 101420532 A | 4/2009 |
| CN | 101529924 A | 9/2009 |
| CN | 102819852 A | 12/2012 |
| CN | 102881011 A | 1/2013 |
| CN | 103049894 A | 4/2013 |
| CN | 103606182 A | 2/2014 |
| CN | 104301621 A | 1/2015 |
| CN | 104463787 A | 3/2015 |

OTHER PUBLICATIONS

International Preliminary Report on Patentability in International Application No. PCT/CN2016/078940 dated Nov. 28, 2017, 7 pages.
Office Action in CN Application No. 201510268553X dated Oct. 15, 2018, 9 pages.
Office Action in CN Application No. 201510268553X dated Feb. 1, 2019, 8 pages.

\* cited by examiner

IMAGE PROCESSING METHOD AND DEVICE

The present application is a continuation application of PCT/CN2016/078940 which claims the priority of Chinese application No. 201510268553.X filed on May 22, 2016.

TECHNICAL FIELD

The present disclosure relates to computer technologies, and particularly, to a method and image processing apparatus.

BACKGROUND

Lens flare is a phenomenon caused by interferences of reflections from a plurality of surfaces when a high-intensity light source enters the frame captured by camera lens. Lens flare causes flare effects in images, such as light spots, halos, or the like. With the development of image processing technology, users may use various graph editing tools editing and beautifying images to add various display effects into images. Flare-like effects is one of beautifying effects often used in editing and beautifying processing's by graph editing tools, and is achieved by manually attaching a selected material image to a target image.

Specifically, a user may specify the position of a light source in an image, manually adjust certain parameters, e.g., color, size or the like, of a material image presenting a flare effect. Then the adjusted material image is blended with the image to produce a simulated flare effect in the image.

The conventional mechanisms for providing simulated flare effects may have drawbacks such as mismatch between the simulated flare effect and the light resource in the image which makes the image looks unreal.

SUMMARY

In view of the above, the present disclosure provides an image processing method to produce a simulated flare effect matching the light source in an image to improve the sense of realism of the simulated flare effect.

In addition, the present disclosure also provides an image processing apparatus to produce a simulated flare effect matching the light source in an image to improve the sense of realism of the simulated flare effect.

In order to address at least some of drawbacks of conventional mechanisms, the following technical mechanisms are provided.

An image processing method may include:
acquiring an input image;
extracting a light source parameter from the input image;
adjusting color of a material image according to the light source parameter;
obtaining an adapted material image matching the input image using a binarization processing according to the material image whose color has been adjusted;
obtaining a flare effect image through calculation using the adapted material image according to the light source parameter; and
blending the input image with the flare effect image.

An image processing apparatus may include:
an image acquiring module, configured to acquire an input image;
a parameter extracting module, configured to extract a light source parameter from the input image;
a material image adjusting module, configured to adjust color of a material image according to the light source parameter, and obtain an adapted material image matching the input image using a binarization processing according to the material image whose color has been adjusted;
a flare effect image generating module, configured to obtain a flare effect image through calculation using the adapted material image according to the light source parameter; and a blending module, configured to blend the input image with the flare effect image.

An image processing method may include:
at a device having at least one processor, an input device and a screen, acquiring an input image submitted by a user through the input device, the input image is a photo presenting an object illuminated by a light source;
extracting a position of a light source from the input image;
determining an area where a material image is to be arranged in the input image according to the position of the light source, content of the material image is associated with a flare effect to be added into the input image;
generating an adapted material image whose size is consistent with a size of the input image, values of pixels within the area in the adapted material image is consistent with values of corresponding pixels in the material image, values of pixels outside the area are zero;
determining a position of flare in the adapted material image according to the position of the light resource and the size of the adapted material image, calculating color values at the position of the flare according to the position of the flare and values of pixels in the area of the adapted material image, and modifying value of pixels at the position of the flare in the adapted material image to be the color values calculated for the position of the flare to obtain a flare effect image; and
blending the input image with the flare effect image to obtain an output image; and
displaying the output image on the screen.

In an example, the method also includes:
extracting a color of the light source from the input image; and
adjusting color values in the material image according to the color of the light source.

In an example, generating the adapted material image whose size is consistent with the size of the input image includes:
creating a blank image whose size is consistent with the size of the input image, overlaying the material image on the area of the blank image to obtain the adapted material image.

In an example, generating the adapted material image whose size is consistent with the size of the input image includes:
modifying values of pixels in the area in the input image to be values of corresponding pixels in the material image, modifying values of pixels outside the area to be zero, to obtain the adapted material image.

In an example, generating the adapted material image whose size is consistent with the size of the input image includes:
adding pixels whose value is zero into the material image to expand the material image to the size of the input image to obtain the adapted material image, the material image is in the area of the adapted material image obtained.

According to the above technical mechanisms, during simulating a flare effect in an input image, a light source parameter is extracted from the input image, a material image is adjusted for adaptation, a flare effect image is generated through calculation using the adjusted material image (i.e. the adapted material image) and then blended with the input image to obtain an output image with simulated flare effect. As such, the simulated flare effect in the output image is made associated with the light source parameter of the input image, and the image processing method and apparatus are capable of adaptively fitting a material image with the light source parameter of the input image, thus can improve the sense of realism of simulated flare effect, simplify user operation, and improve the processing speed.

BRIEF DESCRIPTION OF THE DRAWINGS

Features of the present disclosure are illustrated by way of example and not limited in the following figures, in which like numerals indicate like elements, in which:

FIG. 4b is an example of an output image obtained from calculation using the input image of FIG. 4a and the material image of FIG. 3a;

DETAILED DESCRIPTION

Exemplary embodiments are described below in detail to make the characteristics and merits of the present disclosure apparent. It should be understood that various modifications and variations may be made based on the different embodiments and are all included in the scope of the present disclosure. The following description and drawings are only for illustrative purposes, not for limiting the protection scope of the present disclosure.

Under certain circumstances, flare may increase the brightness of a luminous object and add a sense of realism to the scene, and etc. Producing a simulated flare effect in an image may greatly increase the contrast ratio of the image, and make up for deficiencies of displaying devices in displaying two-dimensional images.

Various embodiments provide an image processing method to make simulated flare effect associated with the light source of the input image, and effectively achieve diversified and seemingly real simulated flare effects.

The image processing method of various embodiments may be implemented by computer program. An apparatus executing the image processing method may be stored in a computer system 100 as shown in FIG. 1 in which the apparatus runs to produce simulated flare effects in images.

Figure 1:
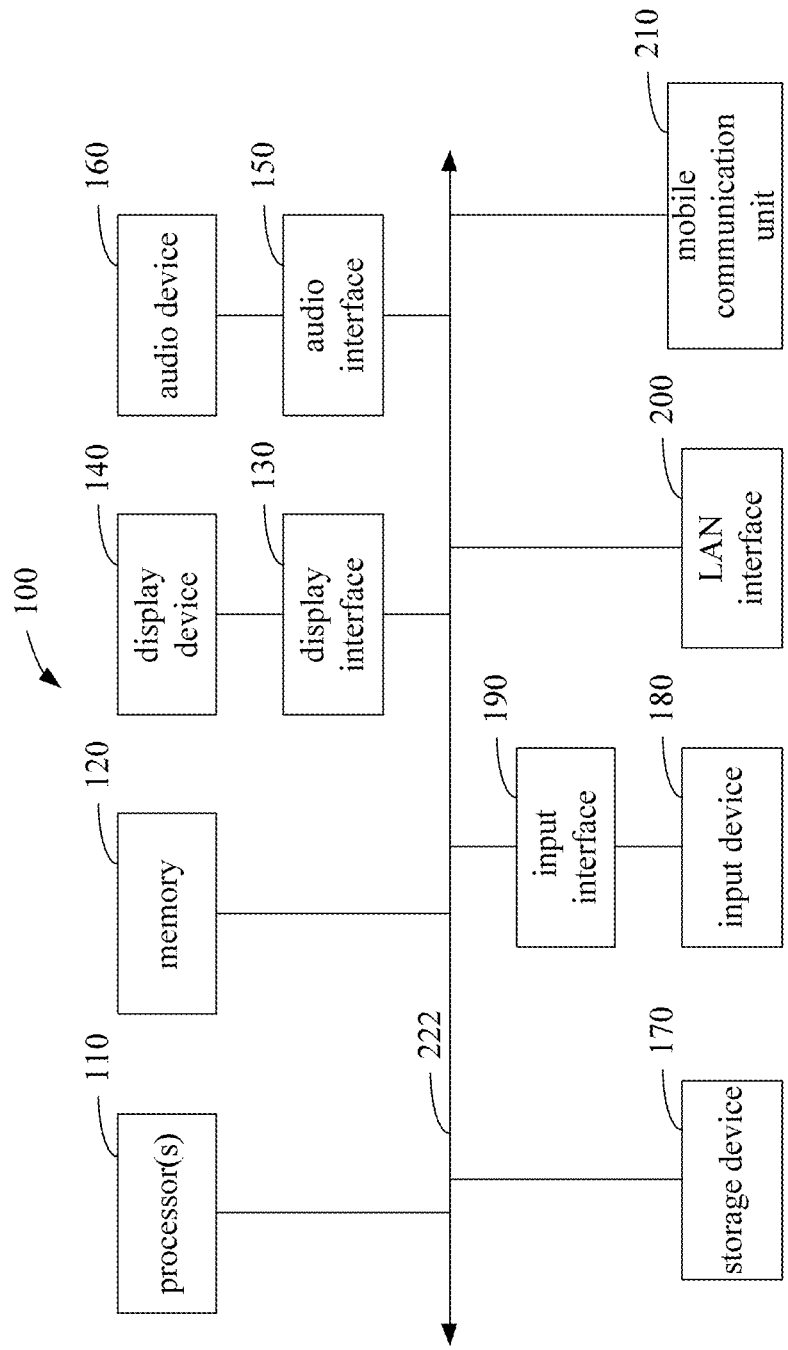
FIG. 1 is a block diagram illustrating a computer system in accordance with embodiments of the present disclosure.

As shown in FIG. 1, the computer system 100 may include a processor(s) 110, a memory 120 and a system bus 122. Various system components including the memory 120 and the processor(s) 110 may be connected with the system bus 122. The processor(s) 110 is hardware capable of executing computer program instructions using basic arithmetic and logic operations of the computer system. The memory 120 is a physical device capable of temporarily or permanently storing computer programs or data (e.g., program status information), and stores material images with various flare effects, program instructions corresponding to the image processing method and other data. The processor(s) 110 may execute computer program instructions in the memory 120, monitor an operation of selecting an image and obtain an input image. After obtaining the input image, the processor(s) 110 may generate a simulated flare effect in the input image. The processor(s) 110 and the memory 120 communicate with each other via the system bus 122. The memory 120 may include read-only-memory (ROM) or flash memory (which are not illustrated), and random-access memory (RAM). RAM usually refers to a main memory where an operating system and applications are loaded.

The computer system 100 may also include a display interface 130 (e.g., a graphic processing unit), a display device 140 (e.g., a liquid crystal display), an audio interface 150 (e.g., a sound card) and an audio device 160 (e.g., a loudspeaker). The display device 140 is capable of displaying the output image having simulated flare effect which is obtained from image processing based on the input image and the material image.

The computer system 100 generally includes a storage device 170. The storage device 170 may be selected from various computer-readable media. The computer-readable medium may be any available medium accessible in the computer system 100, including two types of medium: removable medium and fixed medium. For example, the computer-readable medium may include, but not limited to, a flash memory (Micro SD card), CD, DVD or other optical disk storage, magnetic tape cassette, magnetic tape, magnetic disk storage or other magnetic storage device, or any other medium which may be used to store information and accessible by the computer system 100.

The computer system 100 may also include an input device 180 and an input interface 190 (e.g., an IO controller). A user may input instructions and information into the computer system 100 using the input device 180, such as keyboard, mouse, or touch screen of the display device 140. The input device 180 is usually connected to the system bus 122 via the input interface, and may also be connected via other interface or bus, such as universal serial bus (USB).

The computer system 100 may be logically connected to one or multiple network devices through a network. The network device may be a personal computer, a server, a router, a smart phone, a tablet computer, or other public network node. The computer system 100 may be connected to a network device via a local area network (LAN) interface 200 or a mobile communication unit 210. The local area network (LAN) is a computer network that interconnects computers within a limited area such as a residence, a school, a laboratory, a university campus or an office building having network equipment. Twisted-pair wired Ethernet and Wi-Fi are the two most common transmission technologies in use for LANs. Wi-Fi is a technology for exchanging data between the computer systems 100 or connecting the computer system 100 to the wireless network via radio waves. The mobile communication unit 210 is capable of moving in a wide geographical area while making phone calls through a radio communication line. In addition to the phone calls, the mobile communication unit 210 also provides Internet access in a 2G, 3G or 4G cellular communications system that provide mobile data services.

As in the above, the computer system 100 of the present disclosure may perform image processing operations. The computer system 100 may perform the operations by making the processor(s) 110 execute program instructions in a computer readable medium. The program instructions may be read from the storage device 170 or another device into the memory 120 via a LAN interface 200. Program instructions stored in the memory 120 make processor 110 to perform the image processing method. In addition, a hardware circuit or hardware circuit together with software instructions can also realize the technical mechanism of the present disclosure. Therefore, the present disclosure is not limited to the combination of any particular hardware circuit and software.

The above computer system 100 is merely an example of a computer environment suitable for implementing the technical mechanism of the present disclosure, and should not be considered as a restriction on the scope of the present disclosure. The computer system 100 should not be interpreted as relying on or having a combination of one or multiple components of the illustrated computer system 100.

Figure 2:
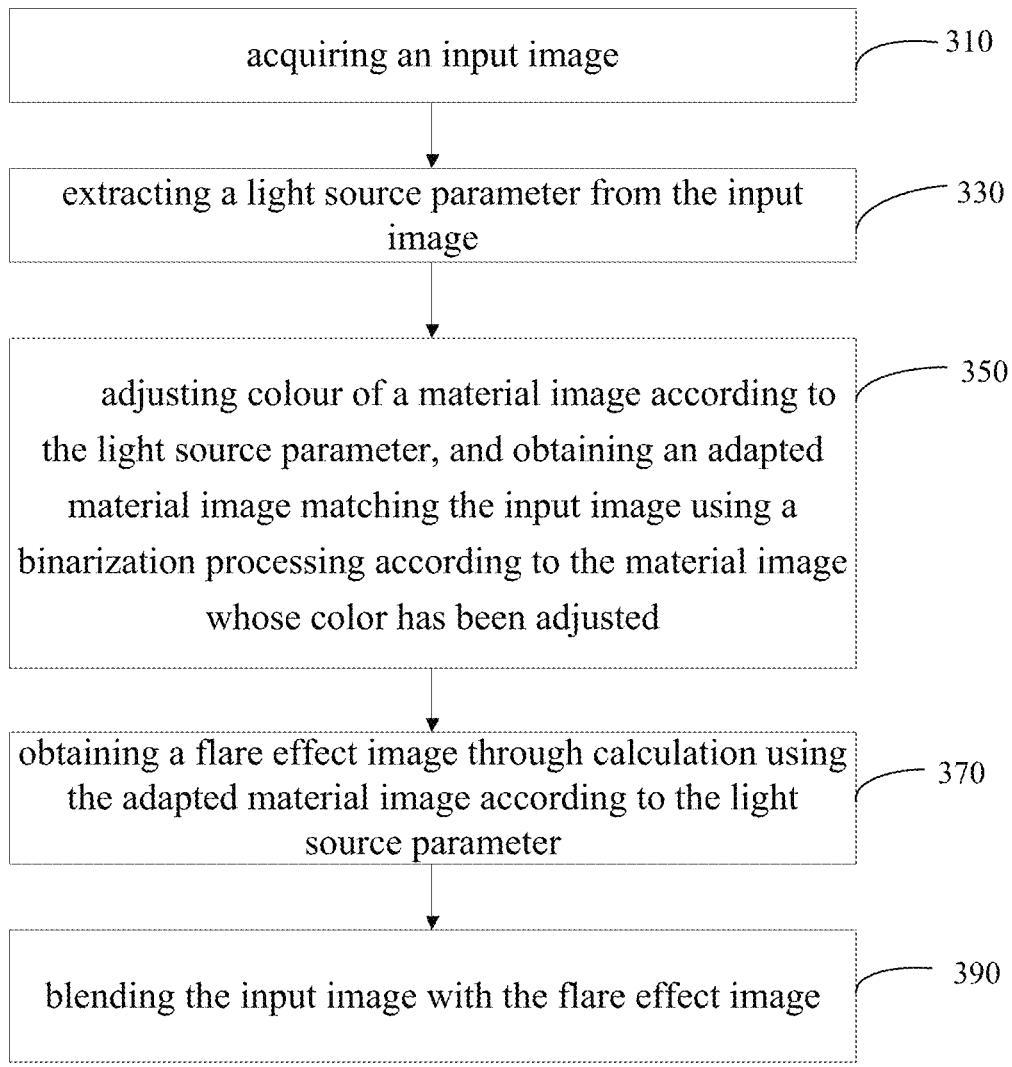
FIG. 2 is a flowchart illustrating an image processing method in accordance with an embodiment of the present disclosure.

As shown in FIG. 2, the image processing method in accordance with embodiments may include the following procedures.

At block 310, an input image may be acquired.

At block 330, a light source parameter may be extracted from the input image.

At block 350, color of a material image may be adjusted according to the light source parameter, and an adapted material image matching the input image may be obtained using a binarization processing according to the material image whose color has been adjusted.

At block 370, a flare effect image may be obtained through calculation using the adapted material image according to the light source parameter.

At block 390, the input image may be blended with the flare effect image.

In the above, the input image may be any image that is to be processed to have simulated flare effect. The input image may be pre-stored in a local device, or may be captured at the moment. For example, an input image may be any image selected from an album in a terminal device according to a user selection operation. The input image may be a two-dimensional image.

A target object is illuminated by a light source when the input image is captured, thus a light source may exist in the input image and the input image may include lighted portions and shaded portions due to the existence of the light source. In some embodiments, the light source may be traced in the input image to extract a light source parameter of the input image.

Material images are preset materials providing source of flare effects to be added into input images. Image content of a material image is associated with the flare effect to be added in the input image. The material image may be a material image with a sunset halo-like effect, a morning sun halo-like effect, light spots effect, or the like. FIGS. 3a to 3i are some examples of the material images.

In some examples, the image processing apparatus may present a plurality of material images in a user interface, and select any of the material images according to a user selection operation for providing the flare effect in the input image.

In some examples, the input image serves as the source image, and the color of the light source in the input message is taken as the reference color, that is, color values of the material image is adjusted in accordance with the light source parameter so that the color of the flare effect in the material image suits the color of the light source in the input image.

Some embodiments of the present disclosure may also process the material image whose color has been adjusted to obtain an adapted material image matching the input image. In some examples, the size of the adapted material image matches the size of the input image. In some examples, the processing may include, but not limited to, binarization, generating a blank image, or the like. The object of the binarization may be the input image or a blank image whose size matches the size of the input image. The adapted material image after the binarization may be a binary image in which the pixels outside an area corresponding to a light source area have a value of 0, so as to facilitate subsequent blending with the input image.

According to embodiments of the present disclosure, values of pixels within an area corresponding to the light source area of the input image in the adapted material image may be replaced with values of corresponding pixels in the material image whose color has been adjusted. In the adapted material image through the above processing, the area has the same flare effect with the material image while color values of pixels outside the area are zero, i.e. the value of each color component is zero.

In the adapted material image which has been through the color adjustment and the binarization, pixels may be processed through calculation according to the light source parameter to obtain a flare effect image matching the light source of the input image. In the flare effect image, light spots or halos in the image are consistent with illumination situation in the input image. The calculation refers to adjusting the flare effect in the adapted material image according to the light source parameter, so that the positions of the light spots or halos in the processed image suit the position of the light source in the input image. In some examples, the calculation may include processing color values of pixels in an area including the flare effect in the adapted material image to obtain color values of pixels at other positions, and the processing may include at least one of decomposing, copying, changing the position, or the like. Algorithm of the calculation may be designed according to the needs as long as the obtained positions of pixels corresponding to the flare effect suit the position of the light source in the input image and the color values of the pixels match color values of pixels in the adapted material image (i.e., color values of pixels in the adapted material image whose color has been adjusted according to the light source). As such, the flare effect image not only has the same type of flare effect with the material image, but also has the flare effect both having colors matching the color of the light source in the input message and at positions suiting the position of the light source in the input image. Thereby, the simulated flare effect is given the characteristics of the light source of the input image.

The input image may be blended with the flare effect image directly so that the scene in the input image, such as objects, scenery or people, has an added flare effect consistent with the illumination situation of the input image. As such, simulation of real life glare effect can be achieved. Various embodiments of the present disclosure may use different blending modes, such as superimposing, soft lighting, screening, or the like.

Figure 3A:
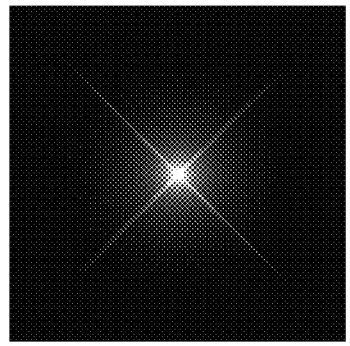
FIG. 3a-3i are examples of material images.
Figure 3B:
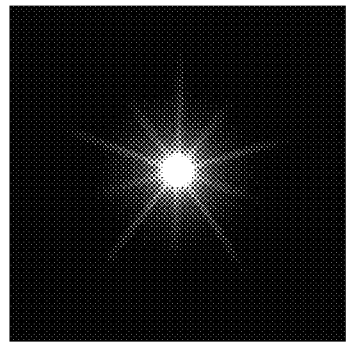
Figure 3C:
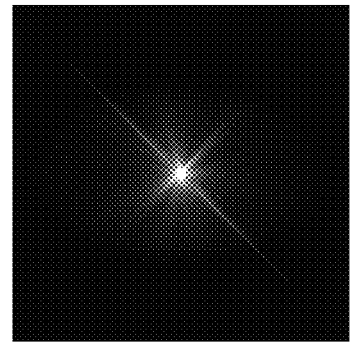
Figure 3D:
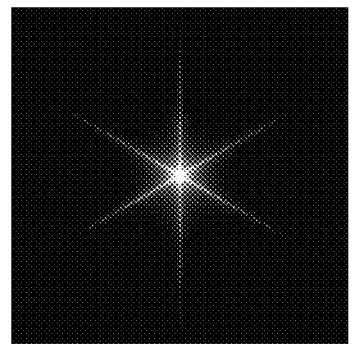
Figure 3E:
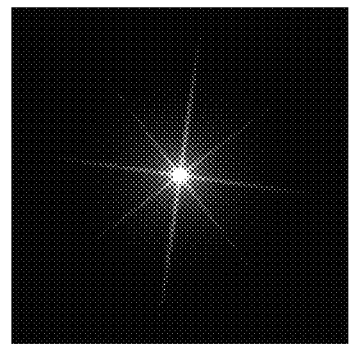
Figure 3F:
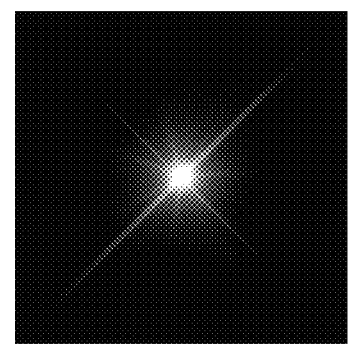
Figure 3G:
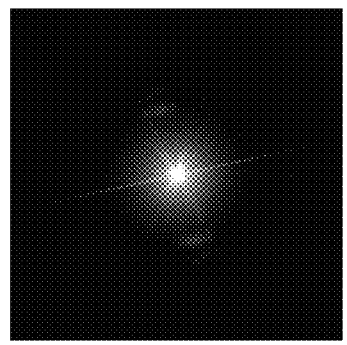
Figure 3H:
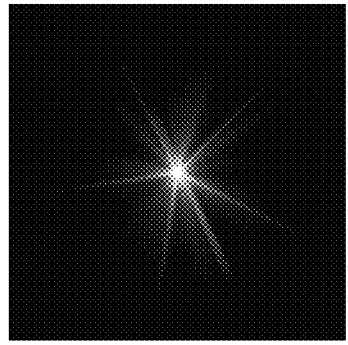
Figure 3I:
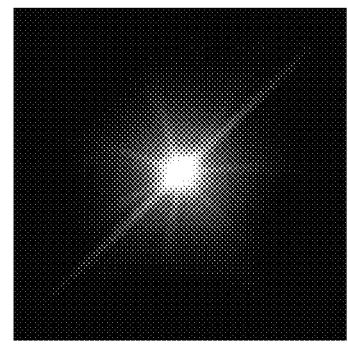
Figure 4A:
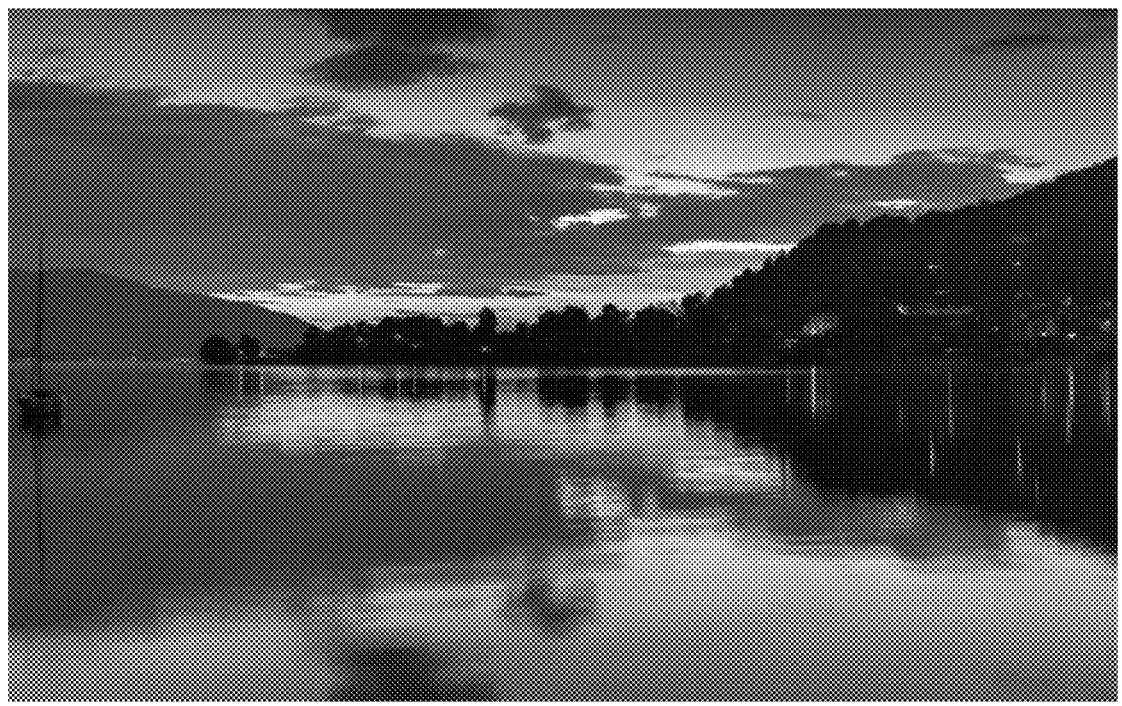
FIG. 4a is an example of an input image.
Figure 4B:
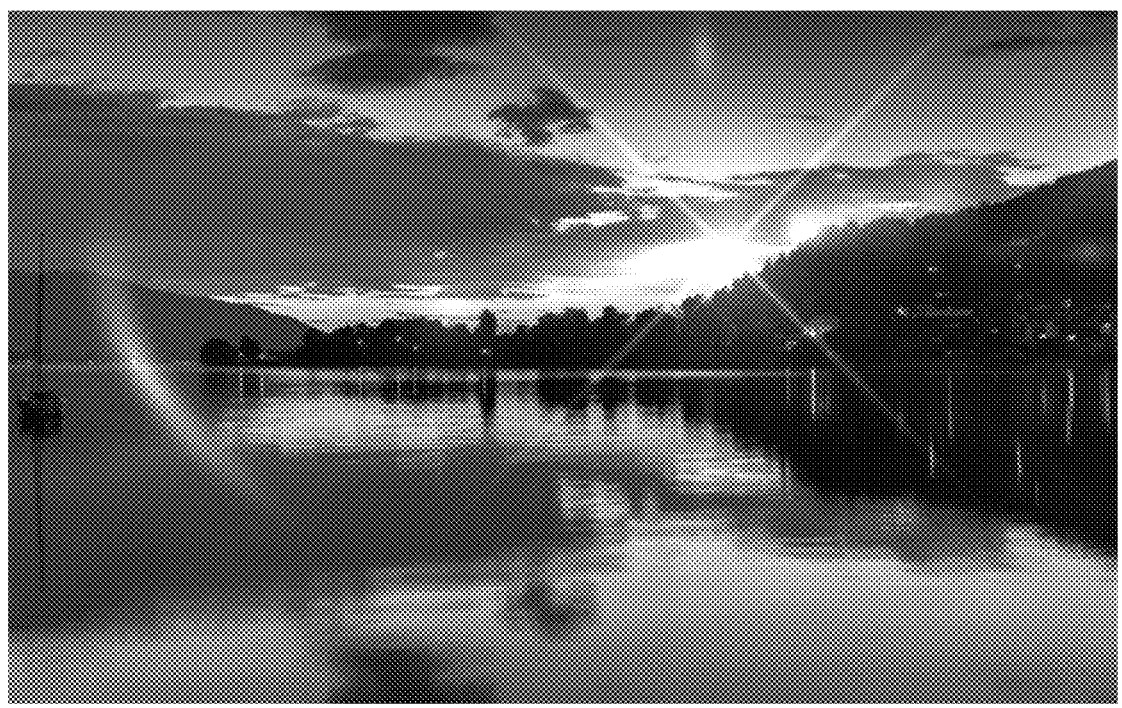

FIG. 4a is an example of an input image, and FIG. 4b is an example of an output image obtained through calculation using the input image of FIG. 4a and the material image of FIG. 3a.

The above process of simulating flare effect in an image can be triggered by a user simply by importing an input image and selecting a material image, and the user does not have to perform extra operations such as adjusting the color of the material image or designating the position to arrange the material image in the input image. Thus, the technical mechanism simplifies user operations, and more importantly, can make light source parameters of the output image associated with the light parameter of the input image, improve the sense of realism of the flare effect blended in the output image, and make the flare effect similar to real life lens flare.

In addition, a plurality of material images with various flare effects may be preconfigured, and any material image selected by the user may be automatically adapted to the light source of the input image.

The user may select different material images for the same input image, and flare effect simulation may be performed using each of the selected material images respectively. In some examples, an image processing apparatus may store certain data during the calculation process, such as the light source parameter extracted from the input image, or the like, so that the previously stored data can be reused when simulating the flare effect for the same input image using a different material image. This manner can improve the calculation efficiency. For the same input image, the user may freely switch the material images, and the image processing apparatus may adaptively adjust the material images to obtain adapted material images with various flare effects. As such, diversified flare effects can be provided for the input image with improved sense of realism.

Figure 5:
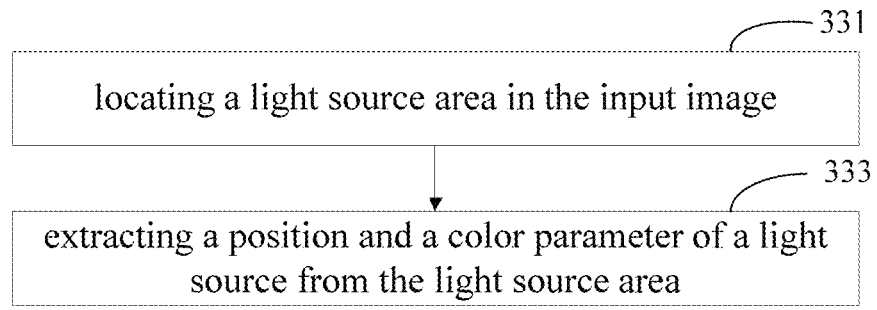
FIG. 5 is a flowchart illustrating a method of executing the step of extracting a light source parameter from the input image of FIG. 2.

In some embodiments, as shown in FIG. 5, the method for extracting the light source parameter (e.g., the procedure in block 330) may include the following procedures.

At block 331, a light source area may be located in the input image.

The light source parameter may include the position of the light source and a color parameter of the light source. The light source area in the input image may be determined through light source tracing, and the position of the light source and a vector indicating the direction of parallel rays may be obtained according to the light source area.

At block 333, the position of the light source and a color parameter of the light source may be obtained from the light source area.

One or multiple light source positions may be obtained from the light source area, and flare effect simulation may be performed respectively taking each of the one or multiple light source positions as the center.

For example, when a single-center halo-like effect is to be simulated, a light source position may be obtained from the light source area, the single-center halo-like effect may be generated through subsequent calculation based on the light source position. When a non-overlapping multi-center halo-like effect is to be simulated, multiple non-overlapping pixels obtained from the light source area may be determined to be multiple light source positions, and multiple non-overlapping halos may be generated by calculating based on each of the multiple light source positions respectively.

According to various embodiments, the light source position may be obtained according to a preset determining method or according to a pre-determined algorithm. For example, the center point of the light source area may be selected as the light source position, or the position of a pixel with the maximum brightness in the light source area may be selected as the light source position, or the like.

In an example, when determining the center point of the light source area as the light source position, the method of determining the position of the light source may include the following procedures.

A coordinate system may be pre-established for the image processing. The coordinate system may be a two-dimensional coordinate system with an arbitrary point in the user interface as the origin of coordinates. In the pre-established coordinate system, the maximum coordinate value and the minimum coordinate value of the light source area in the direction of X axis, referred to as Xmax, Xmin respectively, and the maximum coordinate value and the minimum coordinate value of the light source area in the direction of Y axis, referred to as Ymax, Ymin respectively, may be obtained respectively.

Coordinates (Xm, Ym) of the center point of the light source area may be calculated using formula Xm=(Xmin+Xmax)/2, Ym=(Ymin+Ymax)/2 respectively.

The coordinates (Xm, Ym) of the center point of the light source area are the coordinates of the position of the light source.

The color parameter of the light source includes color information of the pixel obtained at the position of the light source. For example, when the light source is the center point of the light source area, the light source color parameter may be the (R, G, B) values of the pixel at the center point of the light source area; when there are a plurality of light sources, the light source color parameter may be color values of the pixels corresponding to the multiple light sources.

In the above process, the light source area is an area corresponding to the strongest light source in the input image, the simulation of flare effect in the light source area may greatly increase the contrast of the image, enhance the sense of realism of the image, and improve the effect of flare effect simulation in images.

Figure 6:
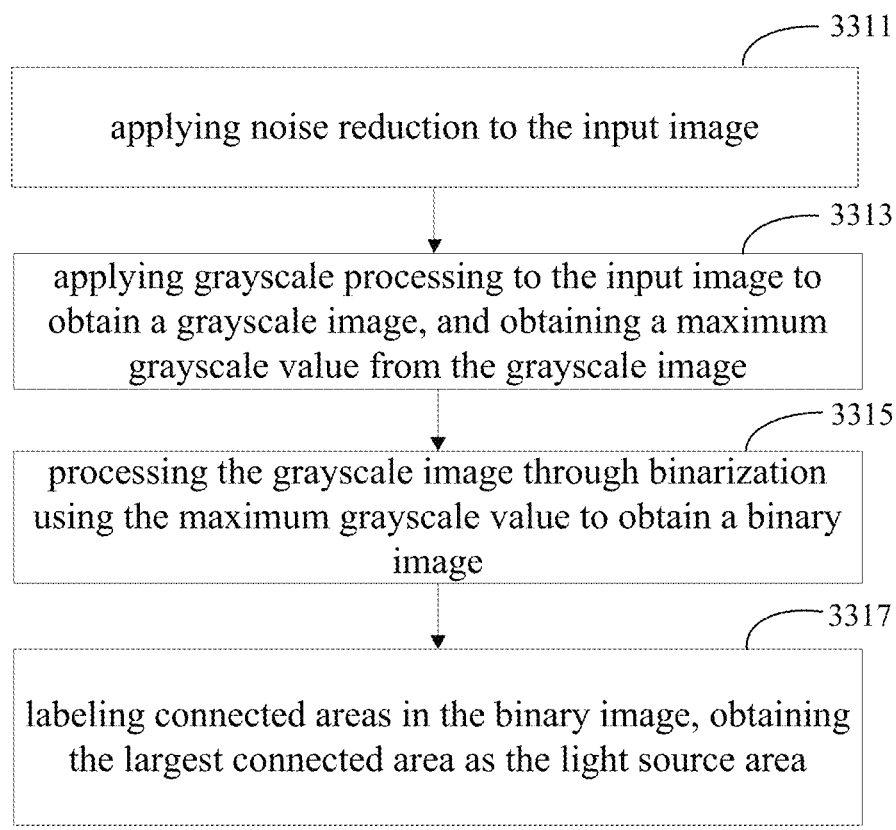
FIG. 6 is a flowchart illustrating a method of executing the step of locating a light source area in the input image of FIG. 5.

According to some embodiments, as shown in FIG. 6, a method of locating a light source area in an input image (e.g., the procedure in block 331 may include the following procedures.

At block 3313, grayscale processing may be applied to the input image to obtain a grayscale image, and a maximum grayscale value of the grayscale image may be obtained.

The grayscale image refers to an image in which the value of each pixel is a in grayscale value. After the input image is determined by a user through a camera or selection operation, the input image may be obtained and converted into a grayscale image. The grayscale image includes a plurality of pixels, and each pixel has a grayscale value.

Pixels of the grayscale image are traversed to obtain the grayscale value of each pixel, and the maximum grayscale value may be obtained from the grayscale values obtained.

At block 3315, binarization may be applied to the grayscale image according to the maximum grayscale value to obtain a binary image.

In an example, the product of multiplying V0 and the maximum grayscale value in the grayscale image may be used as a threshold. V0 is a preset constant value and may be flexibly adjusted in practice.

Through binarization of the grayscale image, an area of the grayscale image may be selected as the light source area. Specifically, all of pixels in the grayscale image may be traversed and it may be judge whether the grayscale value of each pixel is smaller than the threshold. When the value of a pixel is smaller than the threshold, a determination is made that the pixel does not belong to the light source area, and the grayscale value of the pixel may be set as 0; when the value of a pixel is not smaller than the threshold, a determination is made that the pixel is in the light source area, and the grayscale value of the pixel may be set as 255. The binarization is implemented through the above traversing of the pixels, and the binary image can be obtained.

In the binary image, an area in which pixels having a grayscale value of 255 is the light source area, i.e., a white area in the binary image, and an area in which pixels having a grayscale value of 0 is a non-light source area, i.e., a black area in the binary image.

At block 3317, connected areas in the binary image may be labeled to determine the largest connected area, and the largest connected area may be determined to be the light source area.

The connected area refers to an image area composed of a plurality of adjacent pixels having the same pixel value in the image.

The algorithm for labeling the connected area may be a region growing method, or a two-phase method which labels a connected area by scanning the binary image twice, or other connected area labeling algorithms, which are not listed herein.

In some embodiments, when a region growing method is used for labeling the connected area, one connected area may be labeled in one growth process of the region growing method, and only one scan of the image may have all the connected areas labeled, which may increase the image processing speed and improve efficiency.

When labeling the connected area, the number of pixels in each connected area may be recorded, and all connected areas may be searched to obtain the connected area with the most pixels according to the recorded number of pixels of each connected area. The connected area with the most pixels is the largest connected area, and is determined to be the area corresponding to the strongest light source in the input image, i.e. the light source area.

In some embodiments, before the grayscale processing of the input image (e.g., the step at the block 3313), the input image may be processed through noise reduction (at block 3311).

Before the input image is converted into the grayscale image, noise reduction of the input image may be performed to remove the influence of noise and make the subsequent conversion into the grayscale image and the binary image more accurate.

In some embodiments, the input image may be processed through a small-radius Gaussian blur to remove the influence of noise.

Figure 7:
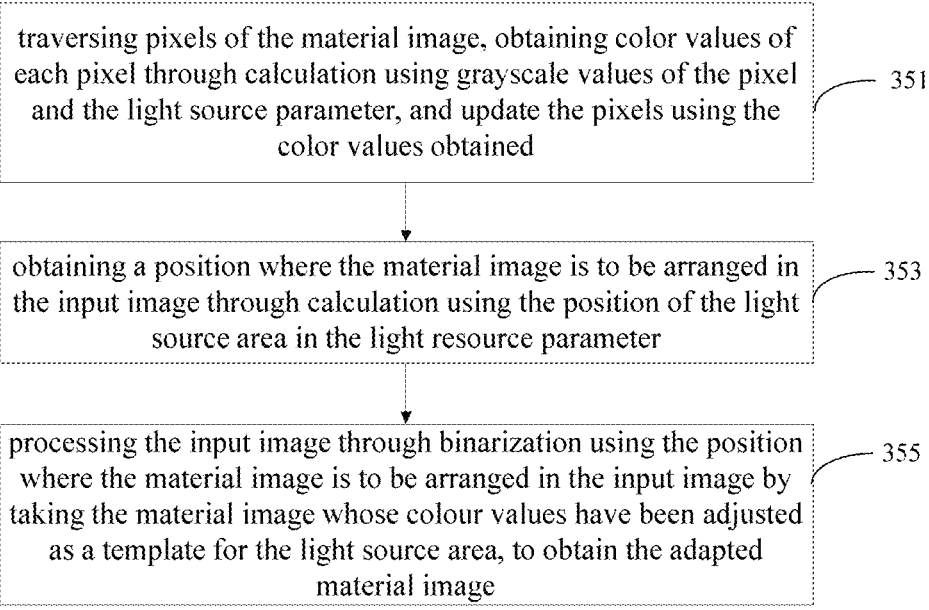
FIG. 7 is a flowchart illustrating a method of executing the step of adjusting color of a material image according to the light source parameter and obtaining an adapted material image matching the input image using a binarization processing according to the material image whose color has been adjusted of FIG. 2.

In some embodiments, as shown in FIG. 7, the method of obtaining the adapted material image (e.g., the procedure in block 350) may include the following procedures.

At block 351, pixels of the material image may be traversed, color values of the pixels may be obtained through calculation using grayscale values of the pixels and the light source parameter, and the pixels may be updated using the obtained color values. In some examples, the method of updating the pixels may include the following procedures.

After the light source parameter is obtained from the input image, pixels of the material image is traversed one by one, and the grayscale value Gray0 of each pixel is calculated during the traversing.

The grayscale value of the pixel is normalized, i.e., Gray1=Gray0/255.

The updated value of the pixel is calculated by using the normalized value and the light source parameter.

For example, it is assumed that the color parameters of the light source obtained at block 333 is (R, G, B).

The updated value of a pixel in the material image is (R*Gray1, G*Gray1, B*Gray1).

The pixel in the material image is updated using the updated value of the pixel.

At block 353, the position of the material image in the input image may be calculated according to the light resource position in the light resource parameter. The calculation may be as follows.

It is assumed that the light source position obtained at block 333 is M (Xm, Ym).

Two vertices of the input image may be obtained. For example, one vertex may be the pixel having the minimum X-axis coordinate and the maximum Y-axis coordinate in the input image, and the other vertex may be the pixel having the maximum X-axis coordinate and the minimum Y-axis coordinate in the input image, i.e., the two vertices are the vertex at the upper left corner and the vertex at the upper right corner of the input image. Other vertices of the input image may also be used for the calculation in other examples.

The distance between each of the two vertices and the light source position M (Xm, Ym) may be calculated to determine a Vertex C (Xc, Yc) which is one of the two vertices having the smallest distance from the light source position M.

The direction of a line that connects the point C and the point M may be determined to be the direction of the ray in the input image, and an angle between the direction of the ray and the X axis may be calculated as follows:

$$\theta = \arctan((Yc-Ym)/(Xc-Xm)).$$

Given a preset constant parameter V1, the position P (Xp, Yp) of the material image in the input image may be calculated as follows:

$$Xp = Xm + \cos\theta * V1;$$

$$Yp = Ym + \sin\theta * V1.$$

The position P obtained according to the above formula is in the direction of ray in the input image, and the distance between the position P and the position of the light source M (Xm, Ym) is V1. The value of the distance V1 may be set according to the size of the material image, so as to makes the material image match with the light source area in the input image and improve the sense of realism of the final simulated flare effect.

At block 355, the input image may be processed through binarization to obtain the adapted material image according to the position of the material image in the input image taking the material image in which color values of pixels have been updated as the template for the light source area. In the adapted material image, values of pixels in the non-zero area are the values of pixels of the material image in which the color values of pixels have been updated, and the size of the non-zero area matches the size of the material image, and the size of the adapted material image matches with the size of the input image, i.e., the size of the adapted material image is exactly the same or roughly the same with the size of the input image, to make the size of the subsequently obtained image with flare effect is the same with the size of the input image and facilitate blending of the flare effect image and the input image.

In an example, the adapted material image may be obtained through the following procedures.

The above procedure obtains the input image, the material image whose color has been adjusted, and the position P (Xp, Yp) of the material image in the input image.

An area where the material image with adjusted color is to be arranged in the input image may be determined according to the position P (Xp, Yp) of the material image in the input image and the template of the light source area, i.e., the material image.

For a pixel in the area of the input image, the value of the pixel may be updated to be the value of a corresponding pixel in the material image with adjusted color. For a pixel outside the area of the input image, the value of the pixel may be updated to be zero.

After the above update process is applied to all of pixels in the input image, values of all the pixels in the input image are updated, and the adapted material image may be obtained.

In addition, regarding implementation complexity, the object of the processing using the material image as the template of the light source area may be the input image as described above. In some embodiments, the object of the above processing may be a blank image, i.e., an image in which color values of all pixels are 0. As such, it is no longer necessary to update the value of the pixels outside the area, which may effectively reduce the amount of calculation and increase processing speed.

Figure 8:
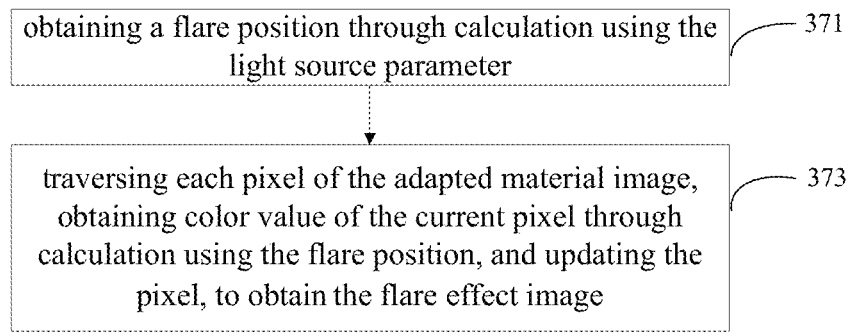
FIG. 8 is a flowchart illustrating a method of executing the step of obtaining a flare effect image through calculation using the adapted material image according to the light source parameter of FIG. 2.

In some embodiments, as shown in FIG. 8, a method of obtaining the image with flare effect by calculation (e.g., the procedure in block 370) may include the following procedures.

At block 371, the position of flare may be obtained from calculation using the light source parameter.

The simulated flare effect in the output image may be embodied by light spots in the output image or by halo, thus the position of flare may be the position of a light spot in the output image or the position of the halo.

Assuming the position of the light source obtained at block 333 is M (Xm, Ym), taking (Xi, Yi) as the coordinates of a current pixel, a direction vector from the point M (Xm, Ym) to the point (Xi, Yi) obtained from calculation is denoted by dir.

According to the direction vector dir and the coordinates of the light source position, the position of the flare may be calculated. The position of flare may be the position of a light spot or the position of a halo, and may be adjusted in image processing to adapt to the content of the input image.

When the flare effect is represented by a light spot, the coordinates of the position of the light spot may be calculated according to:

$$(Xoff, Yoff) = (Xm, Ym) - (Xi, Yi);$$

When the flare effect is represented by a halo, the coordinates of the position of the halo may be calculated according to:

$$(Xoff, Yoff) = dir*V2.$$

In the above, V2 is a constant defined according to experience.

At block 373, pixels in the adapted material image may be traversed during which the color value corresponding to the current pixel may be calculated according to the position of the flare, and the pixels are updated to obtain the image with flare effect.

When traversing pixels of the adapted material image, the coordinates of the current pixel may be denoted by (Xi, Yi), and the corresponding pixel value may be denoted by (Ri, Gi, Bi).

When simulating the effect of a light spot, the coordinates of the position of the light spot obtained at block 371 is used in the following formula:

$$(Xr, Yr) = ((Xi, Yi) + (Xoff, Yoff))*V3*V4 + dir*VR; \quad \text{RGB component R:}$$

$$(Xg, Yg) = ((Xi, Yi) + (Xoff, Yoff))*V3*V4 + dir*VG; \quad \text{RGB component G:}$$

$$(Xb, Yb) = ((Xi, Yi) + (Xoff, Yoff))*V3*V4 + dir*VB. \quad \text{RGB component B:}$$

In the above, V3 is a constant, V4 is the number of light spots (i.e., an integer such as 0, 1, 2, . . . , n), (VR, VG, VB) is a constant parameter, dir is the direction vector from the point M (Xm, Ym) to the point (Xi, Yi).

According to the above formula, the pixel value at the position of a light spot may be calculated to be (Rj, Gj, Bj)=(Ri (Xr, Yr), Gi (Xg, Yg), Bi (Xb, Yb)).

The above formula is also applicable to the calculation for simulating halo-like effect. When the halo-like effect is to be simulated, the coordinates of the position of the halo obtained at block 371 is used in the following formula:

$$(Xr, Yr) = ((Xi, Yi) + (Xoff, Yoff))*V3*V4 + dir*VR; \quad \text{RGB component R:}$$

$$(Xg, Yg) = ((Xi, Yi) + (Xoff, Yoff))*V3*V4 + dir*VG; \quad \text{RGB component G:}$$

$$(Xb, Yb) = ((Xi, Yi) + (Xoff, Yoff))*V3*V4 + dir*VB. \quad \text{RGB component B:}$$

According to the above formula, the pixel value at the position of the halo may be calculated to be (Rj, Gj, Bj)=(Ri (Xr, Yr), Gi (Xg, Yg), Bi (Xb, Yb)).

The above process does not require manual adjustment of the color and the size of the material image and manual selection of the position of the light source in the input image, thus avoids many tedious operations and increases the speed of processing the input image.

According to the above process, simulation of the flare effect is no longer solely decided by the material image and no longer irrelevant to the input image, can provide vivid illuminating effect to the scene in the input image, and make virtual objects in the scene in the input image seem like to have real-life illumination condition.

According to the above process, the image with flare effect to be blended with the input image is generated based on the light source parameter obtained from the input image, therefore the processing of the input image can be more accurate, and the simulated flare effect in the output image can look authentic in the image.

Figure 9:
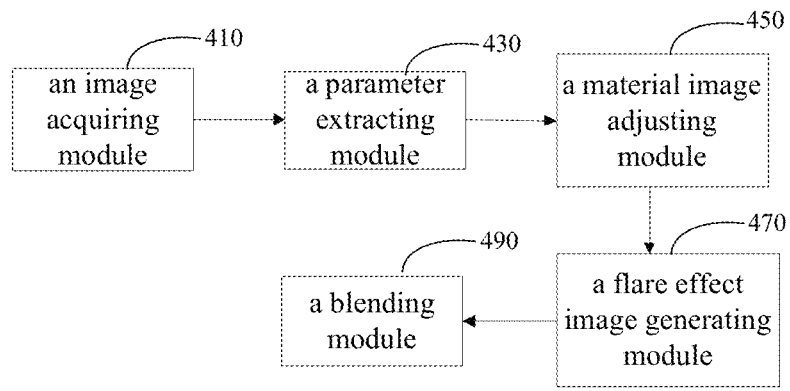
FIG. 9 is a block diagram illustrating modules of an image processing apparatus in accordance with an embodiment of the present disclosure.

Various embodiments also provide an image processing apparatus. As shown in FIG. 9, the apparatus may include an image acquiring module 410, a parameter extracting module 430, a material image adjusting module 450, a flare effect image generating module 470 and a blending module 490.

The image acquiring module 410 may acquire an input image.

The parameter extracting module 430 may extract a light source parameter from the input image.

The material image adjusting module 450 may adjust color of a material image according to the light source parameter, and apply binarization to the material image whose color has been adjusted to obtain an adapted material image matching the input image.

The flare effect image generating module 470 may perform calculation using the adapted material image according to the light source parameter to obtain a flare effect image.

The blending module 490 may blend the input image with the flare effect image to obtain an output image with flare effect.

The image processing apparatus can not only simplify user operations, but also increase the processing speed, and effectively improves the diversity and the sense of realism of the final simulated flare effects.

Figure 10:
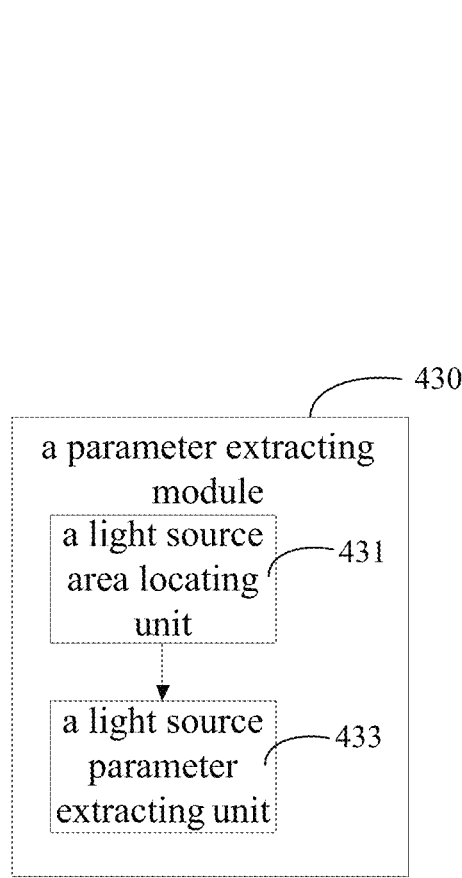
FIG. 10 is a block diagram illustrating the parameter extracting module of FIG. 9.

In some embodiments, as shown in FIG. 10, the parameter extracting module 430 may include a light source area locating unit 431 and a light source parameter extracting unit 433.

The light source area locating unit 431 may locate a light source area in the input image.

The light source parameter extracting unit 433 may extract a position and a color parameter of the light source from the light source area.

Figure 11:
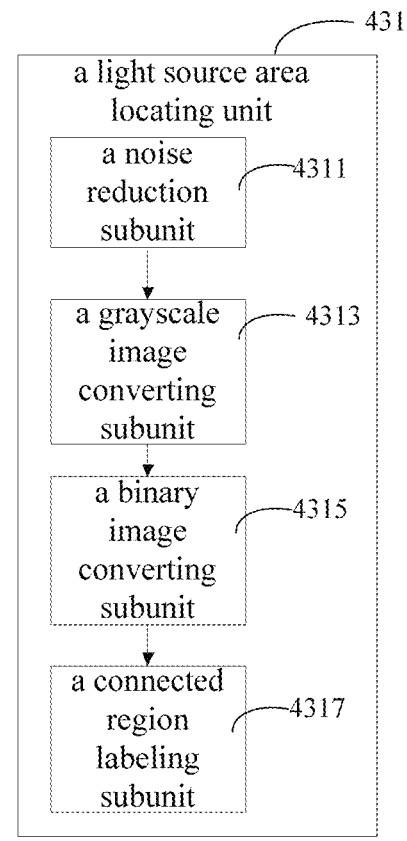
FIG. 11 is a block diagram illustrating the light source area locating module of FIG. 10.

In some embodiments, as shown in FIG. 11, the light source area locating unit 431 may include a grayscale image converting subunit 4313, a binary image converting subunit 4315 and a connected area labeling subunit 4317.

The grayscale image converting subunit 4313 may apply grayscale processing to the input image to obtain a grayscale image, and obtain the maximum grayscale value from the grayscale image.

The binary image converting subunit 4315 may process the grayscale image through binarization using the maximum grayscale value to obtain a binary image. The size of the adapted material image matches the size of the input image.

The connected area labeling subunit 4317 may label connected areas in the binary image, and obtain the largest connected area. The largest connected area is determined to be the light source area.

In some examples, the light source area locating unit 431 may also include a noise reduction subunit 4311, to perform noise reduction processing on the input image.

Figure 12:
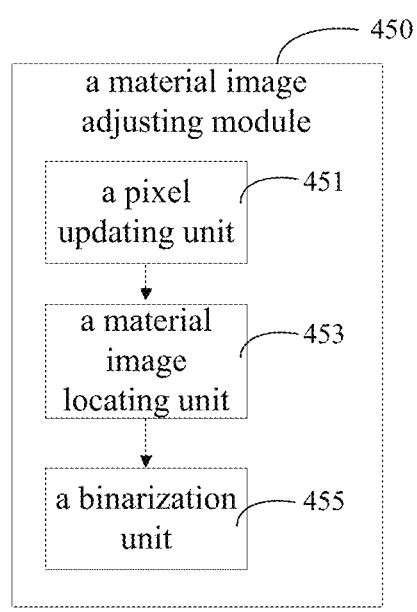
FIG. 12 is a block diagram illustrating the material image adjusting module of FIG. 9.

In some examples, as shown in FIG. 12, the material image adjusting module 450 may include:

a pixel updating unit 451, to traverse pixels in the material image, obtaining color values of each pixel through calculation using a grayscale value of the pixel and the light source parameter, and update the pixels using the color values obtained;

a material image locating unit 453, to obtain a position of the material image in the input image through calculation using the position of the light resource in the light resource parameter; and a binarization unit 455, to process the input image through binarization according to the position of the material image in the input image by taking the material image in which the color values have been updated as a template for the light source area, to obtain the adapted material image.

In some examples, the binarization unit 455 may also modify a value of a pixel at the position in the binarized input image to be a value of the corresponding pixel in the material image whose color has been adjusted, to obtain the adapted material image.

Figure 13:
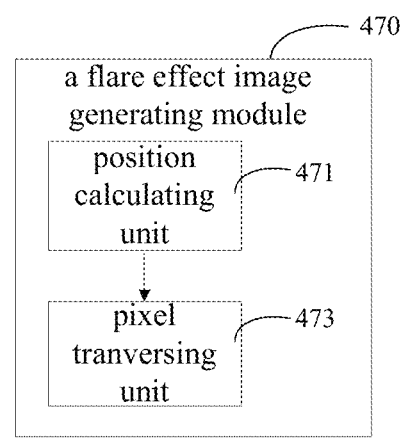
FIG. 13 is a block diagram illustrating the flare effect image generating module of FIG. 9.

In some examples, as shown in FIG. 13, the flare effect image generating module 470 may include:

a position calculating unit 471, to obtain a position of a light spot and a position of a halo through calculation using the light source parameter; and a pixel traversing unit 473, to traverse pixels in the adapted material image, obtain color values of each pixel through calculation using the position of the light spot and the position of the halo, and update the pixels to obtain the flare effect image.

Figure 14:
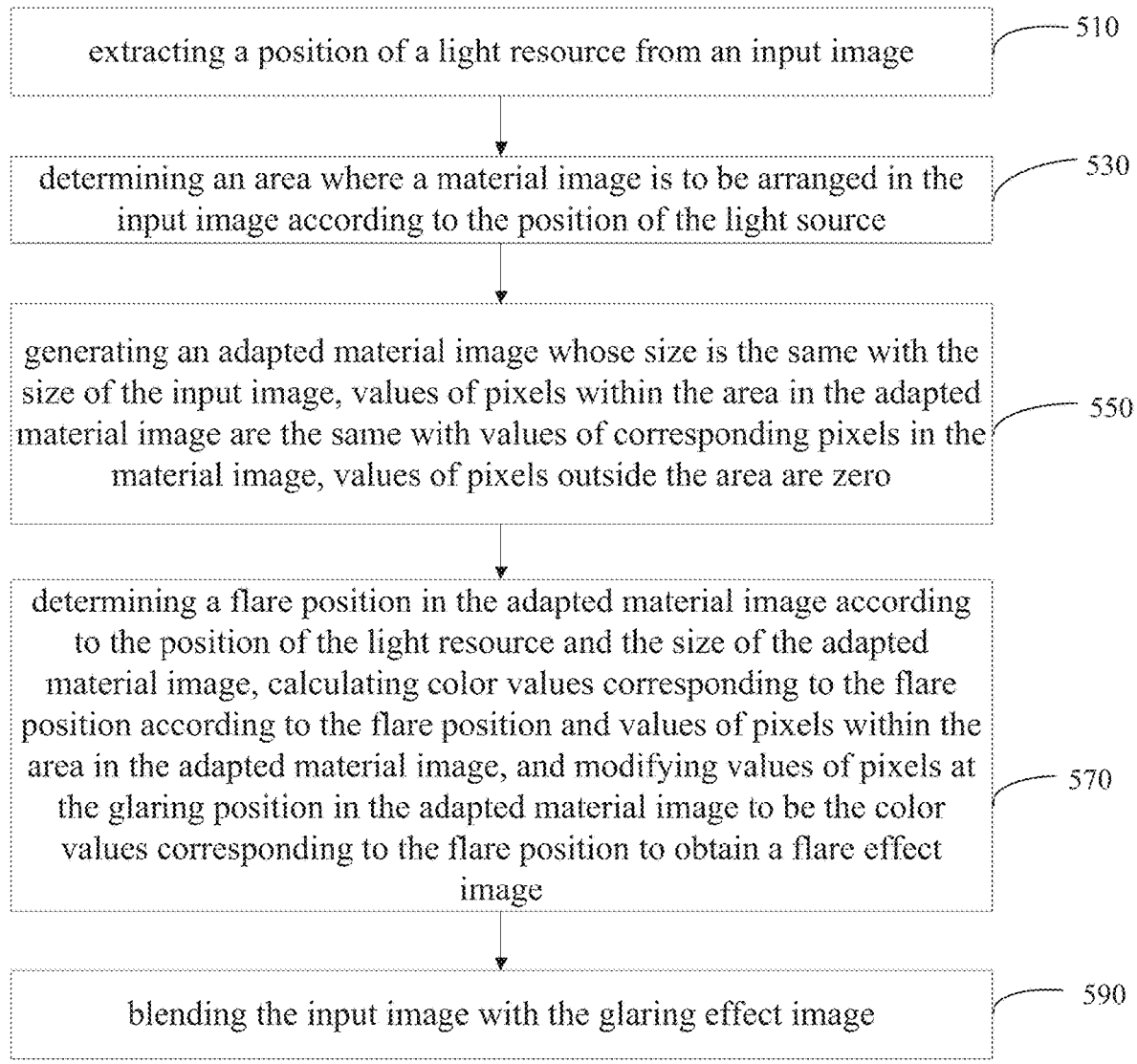
FIG. 14 is a flowchart illustrating an image processing method in accordance with an embodiment of the present disclosure.

As shown in FIG. 14, an image processing method of some examples may include the following procedures.

At block 510, the position of a light resource may be extracted from an input image.

At block 530, an area where a material image is to be arranged in the input image may be determined according to the light resource position.

At block 550, an adapted material image whose size is consistent with the size of the input image may be generated. The value of pixels within the area in the adapted material image is the value of the corresponding pixel in the material image, the value of pixels outside the area is zero.

At block 570, the position of flare in the adapted material image is determined according to the position of the light resource and the size of the adapted material image, color values at the flare position are calculated according to the position of the flare and the values of pixels within the area in the adapted material image, and the value of the pixel at the position of the flare in the adapted material image is modified to be the color values to obtain a flare effect image.

In some embodiments, the method of generating the flare effect image may be as shown in FIG. 8 and related description.

At block 590, the input image is blended with the flare effect image.

According to the above method, the simulated flare effect in the input image not only has the same pattern with the flare effect in the material image, but also has a position suiting the position of the light source in the input image, thus the simulated flare effect looks more real and natural.

In some examples, the method may also include: extracting the color of a light source from the input image; adjusting color values of the material image according to the color of the light source. As such, the color of the flare effect in the output image can be close to the color of the light source in the input image, and the flare effect can look more real.

Various embodiments may use different methods for generating the adapted material image. In an example, a blank image whose size is the consistent with the size of the input image may be created, and the material image is overlaid on the area of the blank image to obtain the adapted material image. In another example, values of pixels in the area of the input image may be modified to be the value of corresponding pixels in the material image, and values of pixels outside the area in the input image may be modified to be zero to obtain the adapted material image. In yet another example, pixels whose value is zero may be added into the material image to expand the material image to the size of the input image to obtain the adapted material image. The material image is arranged in the area of the adapted material image. Other methods for generating the adapted material image may be used, which are not listed herein.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices.

Those skilled in the art can understand that some or all of the steps of the methods of the embodiments may be implemented by hardware, or hardware controlled by software program instructions. The software program may be stored in a computer-readable storage medium. The computer-readable medium may include ROM, discs or compact discs.

Though the present disclosure is described with reference to some embodiments, it should be understood that the terms are merely examples used for illustrative purposes, not for limiting the scope of the present disclosure. The present disclosure may be implemented in various manners without deviating the spirit or characteristics of the present disclosure, thus it should be understood that the embodiments should not be limited to any of the above details and should be given the broadest interpretation consistent with the description and claims as a whole. Any modifications and variations within the scope or equivalent scope of the claims should be covered by the claims.

The invention claimed is:

1. An image processing method, comprising: at a device having at least one processor, an input device and a screen,
   acquiring, in response to a command entered through the input device by a user, an input image in which a flare effect is to be added, the input image is a photo presenting an object illuminated by a light source;
   extracting a light source parameter of the light source from the input image;
   adjusting color of a material image according to the light source parameter, content of the material image is associated with a flare effect to be added into the input image;
   obtaining an adapted material image matching the input image using a binarization processing according to the material image whose color has been adjusted, the adapted material image matches the input image in size, the adapted material image includes a first area in which image content is content of the material image whose color has been adjusted and a second area set to be blank, the second area is an area other than the first area in the adapted material image;
   adding flare into the adapted material image to obtain a flare effect image through calculation based on the adapted material image and the light source parameter;
   blending the input image with the flare effect image to obtain an output image; and
   displaying the output image on the screen;
   wherein adjusting the color of the material image according to the light source parameter comprises:
   traversing pixels of the material image, obtaining color values of each of the pixels through calculation using a grayscale value of the pixel and the light source parameter, and updating the pixels using the color values obtained.

2. The method of claim 1, wherein extracting the light source parameter of the light source from the input image comprises:
   locating a light source area in the input image; and
   extracting a position and a color parameter of a light source from the light source area.

3. The method of claim 2, wherein locating the light source area in the input image comprises:
   applying grayscale processing to the input image to obtain a grayscale image, and extracting a maximum grayscale value from the grayscale image;
   processing the grayscale image through binarization according to the maximum grayscale value to obtain a binary image;
   labeling connected areas in the binary image, and obtaining the largest connected area as the light source area.

4. The method of claim 1, wherein obtaining an adapted material image matching the input image using a binarization processing according to the material image whose color has been adjusted comprises:
   obtaining a position where the material image is to be arranged in the input image through calculation using a position of the light source in the light source parameter; and
   obtaining the adapted material image by applying binarization to the input image using the position by taking the material image whose color has been adjusted as a template of a light source area.

5. The method of claim 4, further comprising:
   modifying a value of a first pixel at the position in the adapted material image to be a value of a second pixel corresponding to the first pixel in the material image whose color has been adjusted to obtain the adapted material image.

6. The method of claim 1, wherein obtaining an adapted material image matching the input image using a binarization processing according to the material image whose color has been adjusted comprises:
   processing a blank image whose size matches the size of the input image through binarization; and
   obtaining a position where the material image is to be arranged in the blank image through calculation using a position of the light source in the light source parameter.

7. The method of claim 6, further comprising:
   modifying a value of a first pixel at the position in the adapted material image to be a value of a second pixel corresponding to the first pixel in the material image whose color has been adjusted to obtain the adapted material image.

8. The method of claim 1, wherein adding flare into the adapted material image to obtaining a flare effect image comprises:
   obtaining a flare position through calculation using the light source parameter;
   traversing pixels in the adapted material image, obtaining color values of each of the pixels through calculation using the flare position, and updating the pixels to obtain the flare effect image.

9. An image processing apparatus, comprising an input device, a screen, at least one processor and memory storing computer-readable instructions executable by the processor to:
acquire, in response to a command entered through the input device by a user, an input image in which a flare effect is to be added, the input image is a photo presenting an object illuminated by a light source;
extract a light source parameter of the light source from the input image;
adjust color of a material image whose content is associated with a flare effect to be added into the input image according to the light source parameter, and obtain an adapted material image matching the input image using a binarization processing according to the material image whose color has been adjusted, the adapted material image matches the input image in size, the adapted material image includes a first area in which image content is content of the material image whose color has been adjusted and a second area set to be blank, the second area is an area other than the first area in the adapted material image;
adding flare into the adapted material image to obtain a flare effect image through calculation based on the adapted material image and the light source parameter;
blend the input image with the flare effect image to obtain an output image; and
display the output image on the screen;
wherein the instructions are executable by the processor to:
traverse pixels in the material image, obtain color values of each of the pixels through calculation using a grayscale value of the pixel and the light source parameter, and update the pixels using the color values obtained.

10. The apparatus of claim 9, wherein the instructions are executable by the processor to:
locate a light source area in the input image; and
extract a position and a color parameter of a light source from the light source area.

11. The apparatus of claim 10, wherein the instructions are executable by the processor to:
apply grayscale processing to the input image to obtain a grayscale image, and extract a maximum grayscale value from the grayscale image;
process the grayscale image through binarization using the maximum grayscale value to obtain a binary image; and
label connected areas in the binary image, and obtain the largest connected area as the light source area.

12. The apparatus of claim 9, wherein the instructions are executable by the processor to:
obtain a position where the material image is to be arranged in the input image through calculation using a position of the light source in the light source parameter; and
process the input image through binarization according to the position where the material image is to be arranged in the input image by taking the material image whose color has been adjusted as a template of a light source area to obtain the adapted material image whose size matches the size of the input image.

13. The apparatus of claim 12, wherein the instructions are executable by the processor to:
modify a value of a first pixel at the position in the input image which has been through the binarization to be a value of a second pixel corresponding to the first pixel in the material image whose color has been adjusted to obtain the adapted material image.

14. A non-transitory computer-readable storage medium, comprising: a processor and a memory storing computer-readable instructions executable by the processor to:
acquire, in response to a command entered through the input device by a user, an input image in which a flare effect is to be added, the input image is a photo presenting an object illuminated by a light source;
extract a light source parameter of the light source from the input image;
adjust color of a material image according to the light source parameter, content of the material image is associated with a flare effect to be added into the input image;
obtain an adapted material image matching the input image using a binarization processing according to the material image whose color has been adjusted, the adapted material image matches the input image in size, the adapted material image includes a first area in which image content is content of the material image whose color has been adjusted and a second area set to be blank, the second area is an area other than the first area in the adapted material image;
add flare into the adapted material image to obtain a flare effect image through calculation based on the adapted material image and the light source parameter;
blend the input image with the flare effect image to obtain an output image; and
display the output image on the screen;
wherein the instructions executable by the processor to:
traverse pixels of the material image, obtain color values of each of the pixels through calculation using a grayscale value of the pixel and the light source parameter, and update the pixels using the color values obtained.

15. The storage medium of claim 14, wherein the instructions executable by the processor to:
locate a light source area in the input image; and
extract a position and a color parameter of a light source from the light source area.

16. The storage medium of claim 14, wherein the instructions executable by the processor to:
obtain a position where the material image is to be arranged in the input image through calculation using a position of the light source in the light source parameter; and
obtain the adapted material image by applying binarization to the input image using the position by taking the material image whose color has been adjusted as a template of a light source area.

17. The storage medium of claim 14, wherein the instructions executable by the processor to:
process a blank image whose size matches the size of the input image through binarization; and
obtain a position where the material image is to be arranged in the blank image through calculation using a position of the light source in the light source parameter.

18. The storage medium of claim 14, wherein the instructions executable by the processor to:
obtain a flare position through calculation using the light source parameter;
traverse pixels in the adapted material image, obtaining color values of each of the pixels through calculation using the flare position, and update the pixels to obtain the flare effect image.

* * * * *